May 14, 1957 A. L. SHOOK 2,791,862
APPARATUS FOR DISPENSING MINNOWS
Filed March 24, 1955 3 Sheets-Sheet 1
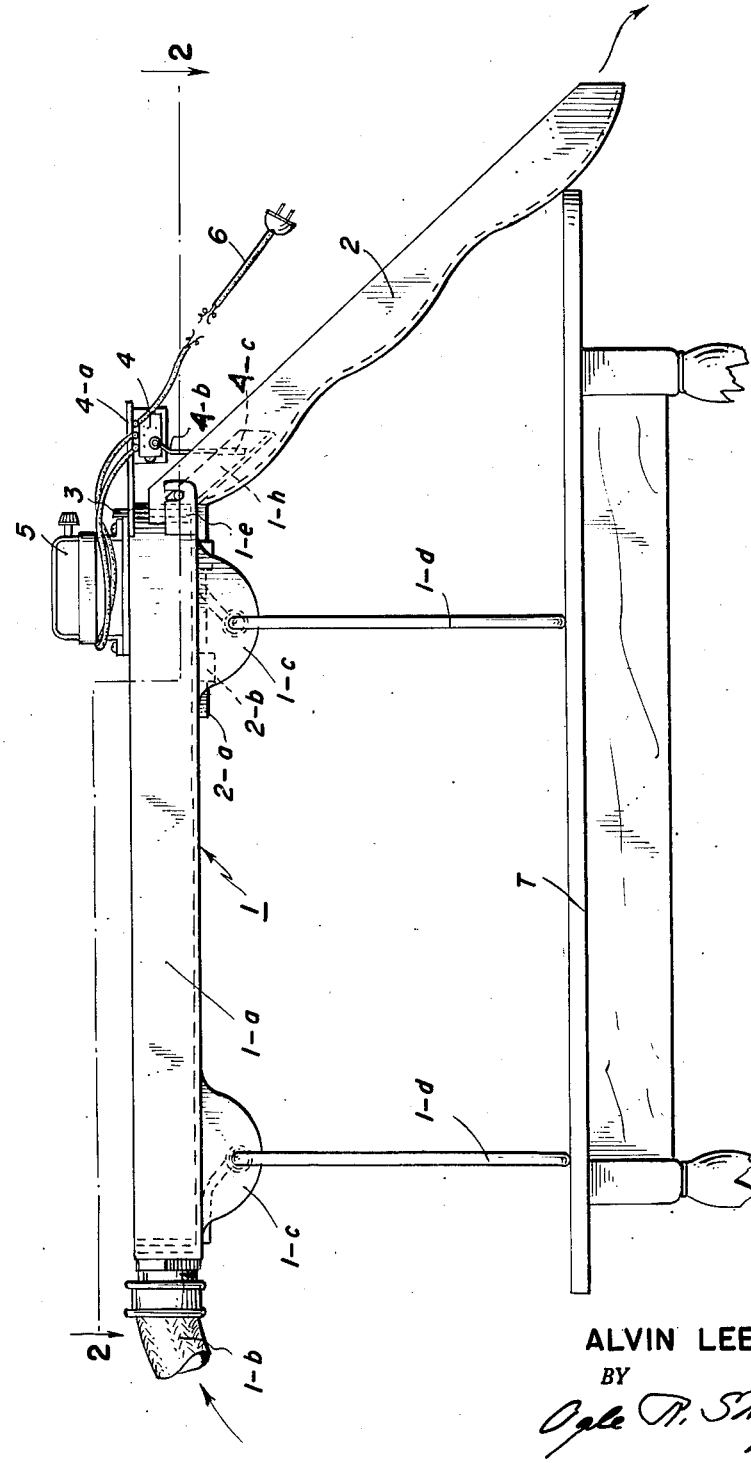
INVENTOR.
ALVIN LEE SHOOK
BY
*Ogle P. Singleton*
ATTORNEY May 14, 1957     A. L. SHOOK     2,791,862
APPARATUS FOR DISPENSING MINNOWS
Filed March 24, 1955     3 Sheets-Sheet 2
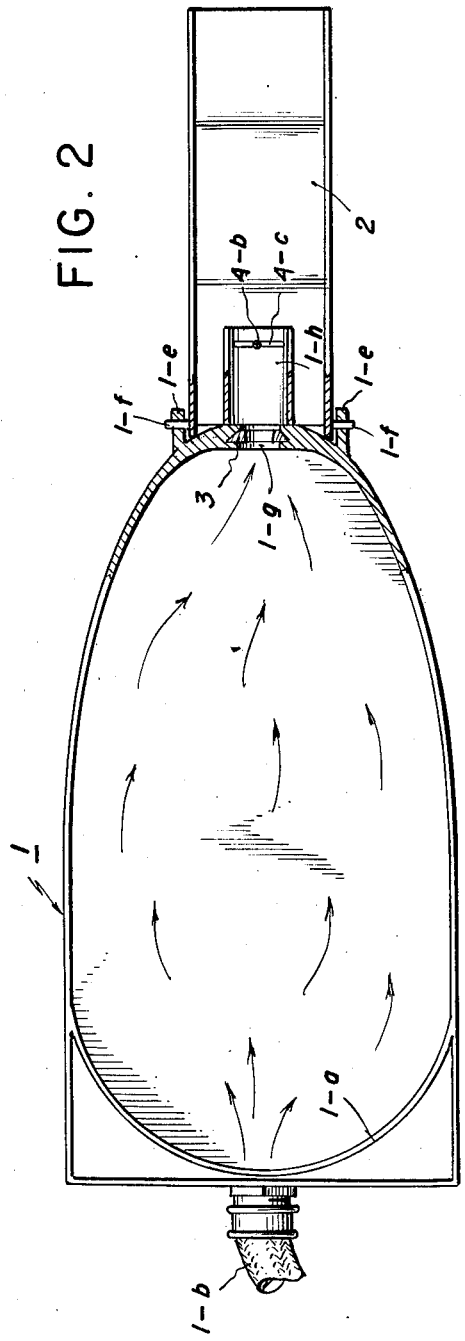
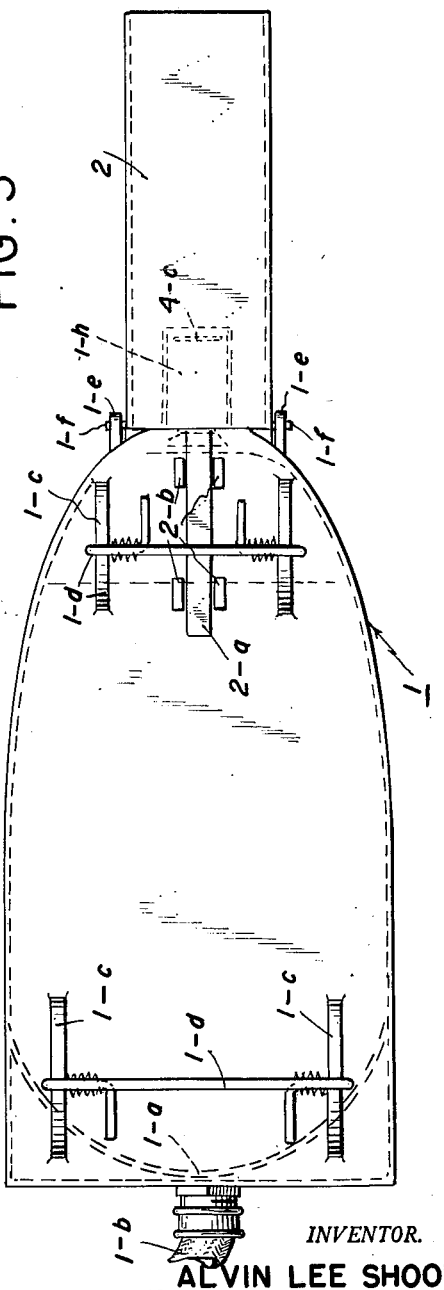
INVENTOR.
ALVIN LEE SHOOK
BY
*Ogle P. Singleton*
ATTORNEY May 14, 1957  A. L. SHOOK  2,791,862
APPARATUS FOR DISPENSING MINNOWS
Filed March 24, 1955  3 Sheets-Sheet 3

INVENTOR.
ALVIN LEE SHOOK
BY
Ogle R. Singleton
ATTORNEY.

United States Patent Office 2,791,862
Patented May 14, 1957

2,791,862
APPARATUS FOR DISPENSING MINNOWS
Alvin Lee Shook, Grayson County, Tex.
Application March 24, 1955, Serial No. 496,477
2 Claims. (Cl. 43—56)

My invention consists in a new and useful improvement in apparatus for dispensing minnows and is designed to provide a device for the purpose of delivering minnows for use as bait by anglers and to provide means for accurately counting the minnows dispersed to eliminate guess work in making sales and avoid loss to the vendor. My improved device eliminates handling of the minnows thereby avoiding any damage or injury to the minnows. My device is also provided with means for accurately determining the size of the dispensed minnows. It is designed for extremely rapid operation whereby the elapsed time for purchasing the minnows is materially reduced.

While I illustrate in the drawings and hereinafter fully describe one specific embodiment of my invention, it is to be distinctly understood that I do not consider my invention limited to said specific embodiment but refer for its scope to the claims appended hereto.

In the drawings:

Fig. 1 is a side elevation of my improved apparatus.

Fig. 2 is a horizontal section on the line 2—2 of Fig. 1, in the direction of the arrows.

Fig. 3 is a bottom plan of the apparatus.

Figure 4:
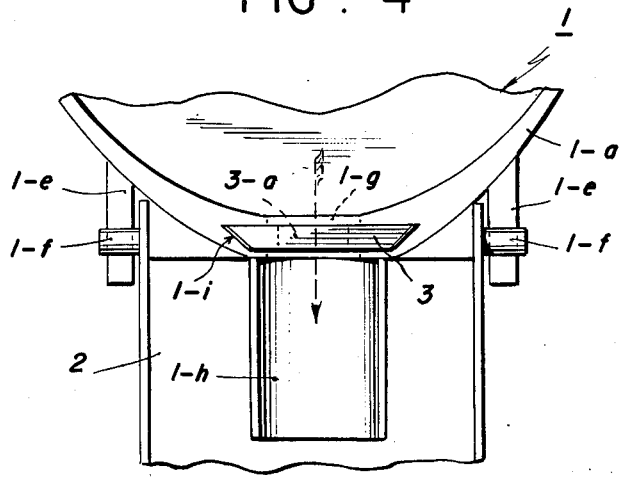
Fig. 4 is an enlarged, fragmentary, top plan of the discharge chute and gate.
Figure 5:
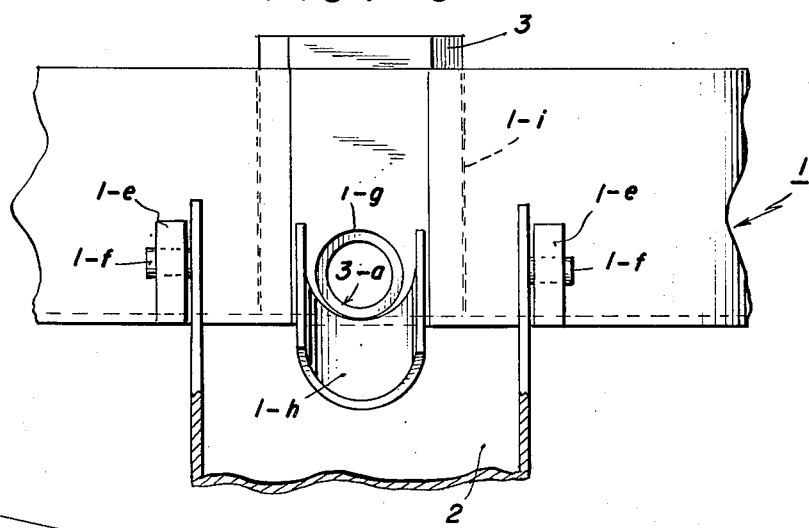
Fig. 5 is an enlarged, fragmentary, front elevation of the chute and gate.

As shown in the drawings, my improved apparatus has a suitable open-top tank 1 with a side wall 1-a provided at its rear end with a suitable supply pipe 1-b for passing water through the tank 1. In lugs 1-c on the under side of the tank 1, folding legs 1-d are suitably mounted for supporting the tank 1 on any suitable supporting medium, such as a table T.

Figure 6:
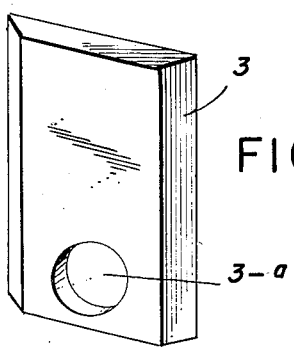
Fig. 6 is a perspective of one of the sizing slides for the gate.

The forward end of the tank 1 has a pair of hooks 1-e in which are received pins 1-f on a chute 2. The wall 1-a is provided directly above the upper end of the chute 2 with a discharge opening 1-g below which there is a spout 1-h mounted on the wall 1-a and discharging into the chute 2. A suitably configured slot 1-i is provided in the wall 1-a, bridging the opening 1-g. A plurality of slides 3 (Fig. 6) is provided, each of which has a passage 3-a therethrough. It is to be understood that the differing diameters of the passages 3-a determine the size of the minnows which can pass out of the tank 1 when the slides 3 are positioned in the slot 1-i. The chute 2 has a tongue 2-a which extends under the tank 1 between guides 2-b on the bottom of the tank 1, to maintain the chute 2 in proper relation to the tank 1.

Suitably mounted on the forward upper edge of the wall 1-a of the tank 1 there is a suitable micro-switch 4 carried by a bracket 4-a fixed on the wall 1-a. The actuator lever 4-b of the micro-switch 4 carries a trigger 4-c which is so disposed in the spout 1-h as to be actuated by the minnows passing from the tank 1 through the spout 1-h into the chute 2.

An electric counter 5, such as is disclosed by U. S. Patent No. 2,444,570, is connected with the micro-switch 4 for actuation thereby. Electric current for the micro-switch 4 and the counter 5 is supplied by a suitable power line 6.

Having described the details of construction of my apparatus I will now describe its operation and use.

When the apparatus is not in use, it can be conveniently stored by disconnecting the pipe 1-b from the tank 1, removing the chute 2 from the tank 1, and folding the legs 1-d up against the bottom of the tank 1. Also the micro-switch 4 and the counter 5 may be removed from tank 1.

When the apparatus is to be used, it is conditioned as illustrated in Fig. 1. Water is supplied to the tank 1 through the pipe 1-b and retained therein by closing the discharge opening 1-g in any suitable way, as by a slide 3 which has no passage 3-a, until the proper quantity of water has been supplied to the tank 1, and the supply is then cut off.

The minnows are dipped out of the conventional storage vat and put into the water in the tank 1. The minnows thus supplied to the apparatus are of different sizes and the first stage in the use of the apparatus is to separate the different sizes.

A slide 3, which has a passage 3-a of a diameter sufficient to allow passage of only the smallest minnows, is placed in the slot 1-i, and the flow of water is resumed. The smallest minnows, carried by the flowing water, pass out of the tank 1 through the spout 1-h and the chute 2 into any suitable container (not shown).

If it is desired to count this supply of smallest minnows, the micro-switch 4 and the counter 5 are activated by electric current through the line 6. When the desired number of minnows has been counted, the flow is interrupted by closing the opening 1-g as above described.

If larger minnows are to be sold, it is obvious that by the use of proper slides 3 the supply of minnows in the tank 1 can be sized, the several sizes being disposed in separate containers, and when the minnows of the desired size pass through the spout 1-h they can be counted as above described. It is also obvious that after the minnows have been sized those of a particular size can be replaced in the tank 1 and counted as they pass therefrom.

Having described my invention, what I claim is:

1. In an apparatus for dispensing minnows, the combination of an open top tank having an inlet port and an outlet port; an oscillatable member so disposed on said tank, adjacent said outlet port, as to be oscillated by minnows passing from said tank through said outlet port; a micro-switch mounted on said tank and adapted to be actuated by said member's oscillations; and a counter mounted on said tank and adapted to be operated by said micro-switch.

2. In an apparatus for dispensing minnows, the combination of an open top tank having an inlet port and an outlet port; a chute removably attached to said tank; a spout connecting said outlet port and said chute; a micro-switch removably mounted on said tank and having an actuating lever provided with a trigger so disposed in said spout as to be operated by minnows passing through said spout; and a counter mounted on said tank and adapted to be operated by said micro-switch.

References Cited in the file of this patent

UNITED STATES PATENTS

| | | |
|---|---|---|
| 747,703 | Harris et al. | Dec. 22, 1903 |
| 763,019 | Phinney | June 21, 1904 |
| 1,690,756 | Stebler | Nov. 6, 1928 |
| 2,369,577 | Kielland | Feb. 13, 1945 |
| 2,438,739 | Burruss | Mar. 30, 1948 |
| 2,643,481 | Ederer | June 30, 1953 |
| 2,690,158 | Petty | Sept. 28, 1954 |

FOREIGN PATENTS

| | | |
|---|---|---|
| 355,845 | France | Sept. 15, 1905 |